United States Patent [19]

Kosaka et al.

[11] Patent Number: 5,267,148
[45] Date of Patent: Nov. 30, 1993

[54] COMPUTER AIDED REAL-TIME DECISION SUPPORT SYSTEM AND METHOD

[75] Inventors: Michitaka Kosaka, Sagamihara; Hirotaka Mizuno; Toshiro Sasaki, both of Yokohama; Hidenori Naoe, Kawasaki; Kuniaki Matsumoto, Tokyo, all of Japan

[73] Assignee: Hitachi, Ltd., Tokyo, Japan

[21] Appl. No.: 475,731

[22] Filed: Feb. 6, 1990

[30] Foreign Application Priority Data

Feb. 27, 1989 [JP] Japan .................................. 1-42970

[51] Int. Cl.5 ............................................ G06F 15/20
[52] U.S. Cl. ................................. 364/408; 364/401; 379/93; 379/96; 379/97; 379/98
[58] Field of Search ................... 364/408, 401; 379/96, 379/93, 97, 98

[56] References Cited

U.S. PATENT DOCUMENTS

| | | | |
|---|---|---|---|
| 4,656,654 | 4/1987 | Dumas | 379/96 |
| 4,677,552 | 6/1987 | Sibley, Jr. | 364/408 |
| 5,077,665 | 12/1991 | Silverman et al. | 364/408 |

Primary Examiner—Roy N. Envall, Jr.
Assistant Examiner—Gita D. Shingala
Attorney, Agent, or Firm—Fay, Sharpe, Beall, Fagan, Minnich & McKee

[57] ABSTRACT

A computer in a securities dealing decision support system is connected via a communication line to a dealer/trader terminal device and customer terminal device. A voice communication line is connected between the dealer/trader terminal device and customer terminal device. The information generated at the computer is outputted to both the terminal devices at the same time. The customer can decide the securities dealing by using the voice communication line while looking at the same information as that for the dealer/trader.

14 Claims, 16 Drawing Sheets

FIG.18

| MASTER WORK STATION NO. | SLAVE WORK STATION NO. |
|---|---|
| | |
| | |
| | |
| | |

| CUSTOMER GROUP | CUSTOMER NAME | REQUEST ORDER | WORK STATION NO. |
|---|---|---|---|
| | | | |

71

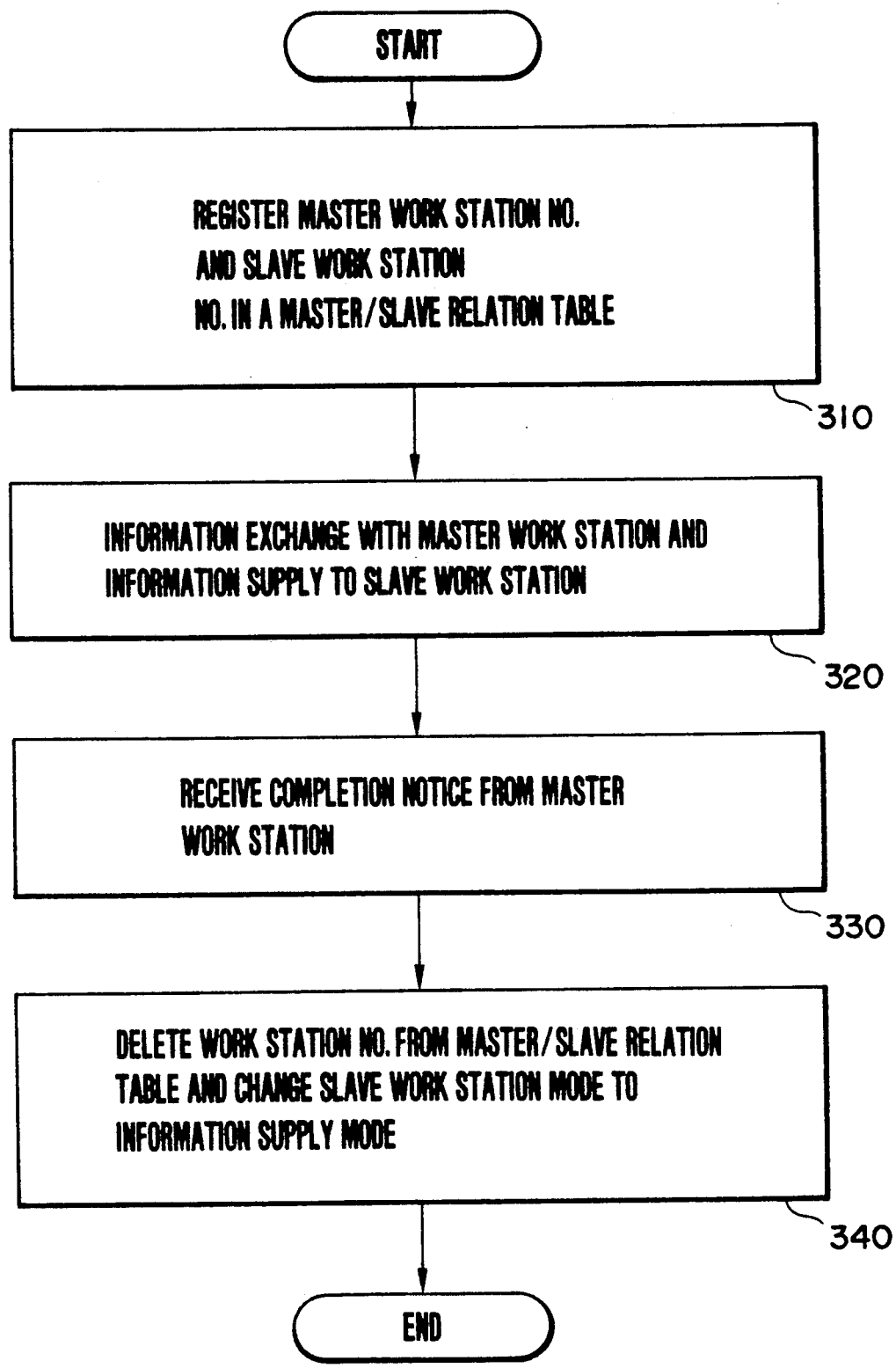

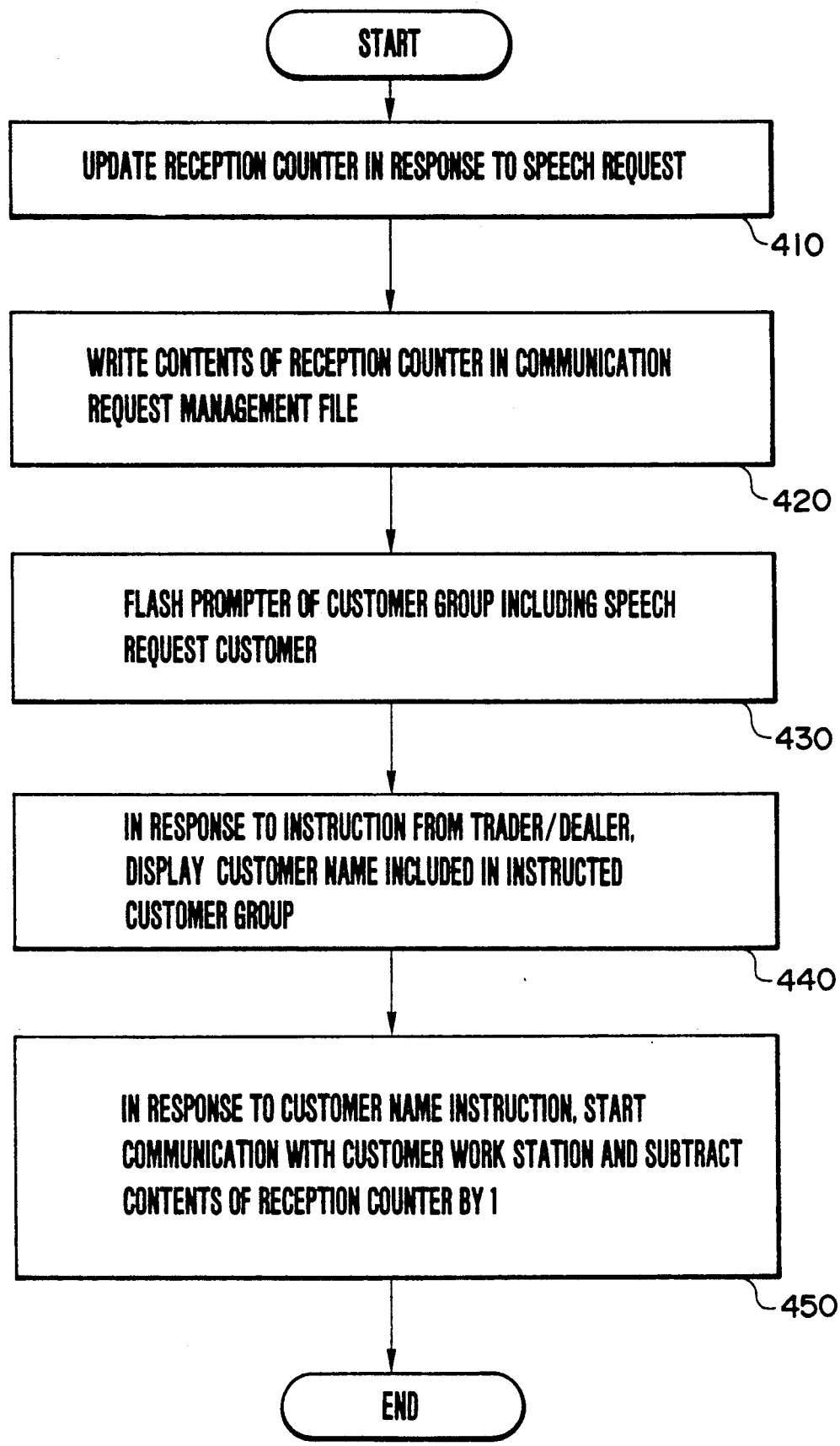

COMPUTER AIDED REAL-TIME DECISION SUPPORT SYSTEM AND METHOD

BACKGROUND OF THE INVENTION

The present invention relates to an information control method for a securities dealing support system such as a trading support system which supports, or assists in the dealing of securities such as bonds and debentures, and to a securities dealing support system itself.

A conventional dealing system for bonds, debentures or the like is disclosed in Japanese Patent Laid open Publication JP-A-61-86867. With this system, customers who intend to deal with bonds or debentures are supplied with a plurality of type of data made at a host computer in menu form, or with the information requested by customers. The system automatically processes securities dealing proposed by customers. Information exchange between investors and dealers and/or traders is carried out in the following manner. The term "dealers and/or traders" is represented by "dealer/trader" hereinunder where applicable.

There is shown in FIG. 2 the flow of information about the decision support for the dealer/trader who deals with bonds and debentures, and about the dealings between the dealer/trader and customers. Namely, in accordance with the market information at a stock exchange 21 or the like dealing with bonds, debentures and the like, the dealer/trader 23 consults customers 24 for securities dealing. In accordance with the securities dealing information supplied from customers 24, the dealer/trader 23 sends an order to the market. The information has been transferred heretofore via a telephone between dealers and traders or between traders and customers. The dealing information has been supplied to the dealer/trader in such a manner that a computer calculates the dealing support information in real time on the basis of market information and outputs the information to the display 22 of a work station at the dealer/trader. There is shown in FIGS. 3A and 3B an example of a conventional trading support computer system. In the system shown in FIG. 3A, market information is received at a computer 31 which selects desired information and sends it onto a Local Area Network (LAN) 32. A terminal device 33 picks up desired information from the information flowing on LAN 32 to thereby supply necessary information for dealing with bonds, debentures or the like. The dealer/trader communicates with customers via a communication system 34 while observing the screen of the terminal device 33.

In the system shown in FIG. 3B, A computer 31 receives market information and calculates desired securities dealing support information which is supplied to a terminal device 33. The dealer/trader communicates with customers via a communication system 34 while observing the screen of the terminal device 33.

SUMMARY OF THE INVENTION

It is an object of the present invention to provide a method and system having a nature of information simultaneity between the dealer/trader and customers, capable of allowing the dealer/trader and investors or customers to consult with each other with regard to a dealing decision involving securities such as bonds and debentures while observing common information (i.e., the screens displaying the common information).

It is another object of the present invention to provide a method and system having a function to protect information, capable of allowing the accessible dealing support information of the dealer/trader, which essentially differs from that of the customers, to be protected so as not to be accessible by customers.

It is a further object of the present invention to provide a method and system having a nature of real-time decision of dealing timing, capable of allowing the dealing timing requested by a customer to be supplied in real-time in accordance with the ever-changing market information, and when a suitable dealing timing comes, identifying a particular customer for that timing.

It is a still further object of the present invention to provide a method and system capable of, even during a speech communication between the dealer/trader and a customer, allowing a communication request by another customer or a dealing timing suitable for a particular customer to be displayed on the screen.

It is another object of the present invention to provide a method and system capable of, when communication requests are made by a plurality of customers at the same time, allowing a priority order to be determined so that the customers can be accessed from a higher priority order.

In order to achieve the above objects of the present invention, there is provided a decision support system wherein the information necessary for securities dealing is obtained on the basis of securities information, the system comprising a computer for outputting the obtained information, a dealer/trader terminal for displaying the information from the computer and inputting/outputting voice information, and a customer terminal for displaying the information from the computer and inputting/outputting voice information to/from the dealer/trader terminal.

In this system, the above objects of the present invention can be achieved by the provision of the decision support method wherein the information necessary for securities dealing is obtained on the basis of securities information, the obtained information is outputted to the dealer/trader and customer terminals, and inputting/outputting voice information is allowed between the dealer/trader and customer terminals.

According to an aspect of the present invention, a communication request from another customer is accepted and displayed on the dealer/trader terminal while displaying the information necessary for securities dealing.

According to another aspect of the present invention, there is provided a knowledge data base for storing the dealing conditions for securities, and if the conditions stored in the knowledge data base are met, there is established a communication between a customer with the satisfied dealing conditions and the dealer/trader.

BRIEF DESCRIPTION OF THE DRAWINGS

FIG. 18 is a master/slave relation table.

FIG. 19 is a customer request management table.

FIG. 22 is a flow chart showing processes at the host computer for the simultaneous communication of voice and information between work stations.

FIG. 23 is a flow chart showing processes at the host computer upon a speech communication request by a customer.

DESCRIPTION OF THE PREFERRED EMBODIMENTS

The embodiments of this invention will be described with reference to the accompanying drawings.

Figure 1:
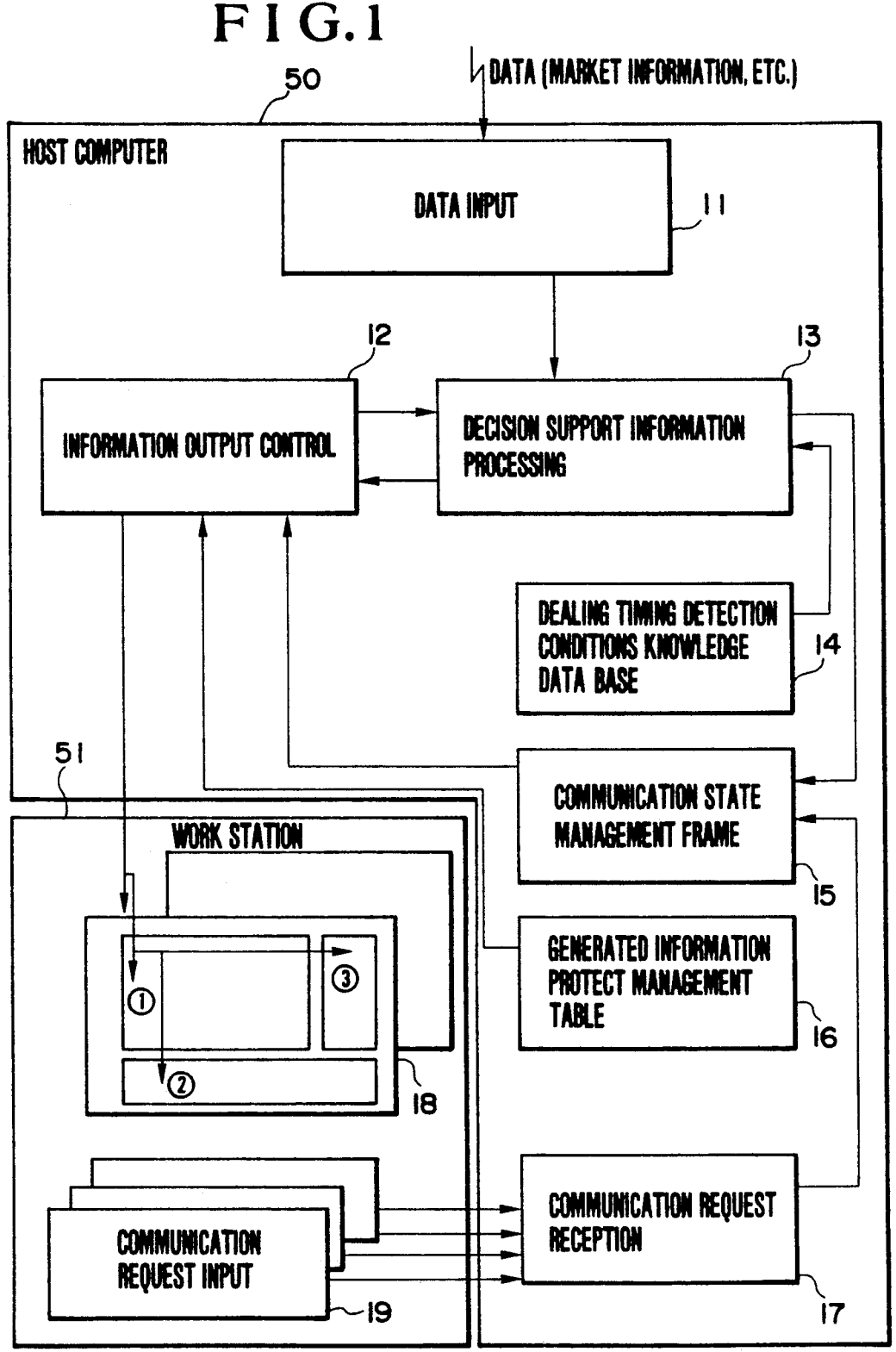
FIG. 1 illustrates the structure of a real-time decision support system.
Figure 2:
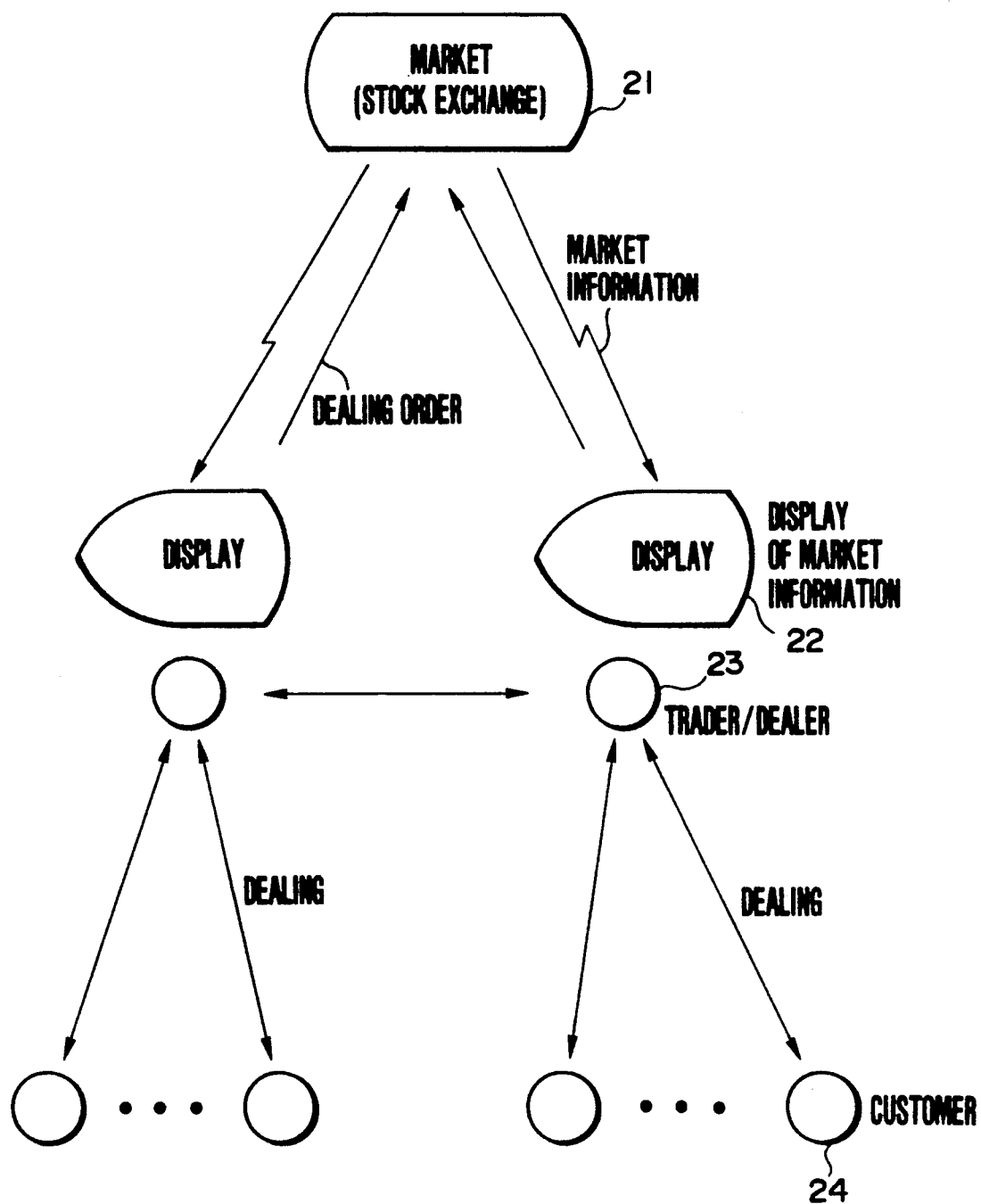
FIG. 2 illustrates the relationship between real-time information and securities dealing.
Figure 3A:
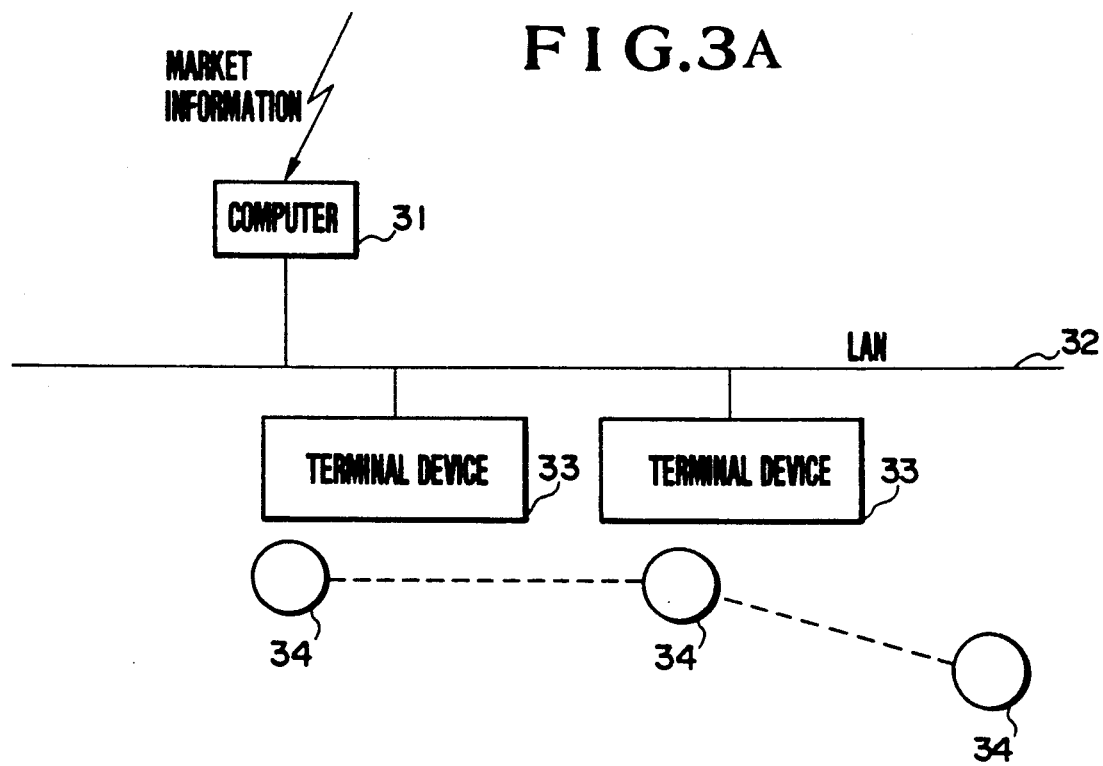
FIGS. 3A and 3B show the structure of conventional trading support systems.
Figure 3B:
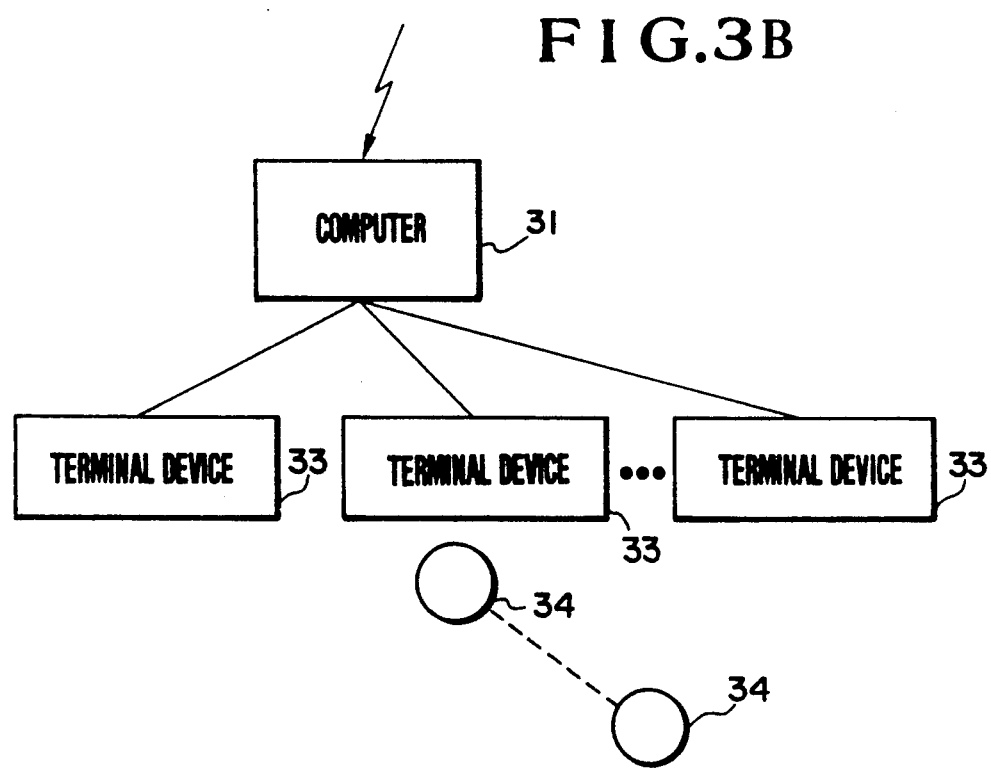

FIG. 1 shows the outline of the decision support system of this invention. This system is constructed of a host computer 50 and work stations 51. There are provided in the host computer 50 a data input program 11 for inputting data such as market information from external medium via a communication line or the like, an information output control program 12, a decision support information processing program 13, and a communication request reception program 17. The host computer 50 is further provided with a knowledge data base 14 for storing dealing timing detection conditions, a frame storage area 15 for the management of communication state with work stations 51, and a generated information protect management table 16.

Work stations 51 shown in FIG. 1 are used for both the dealer/trader and customers. Each work station is a multi-window work station 18. A communication request 19 is made by each work station.

The system elements shown in FIG. 1 will be described in detail hereinunder.

(1) Logical Communication State Management Frame 15

Figure 4:
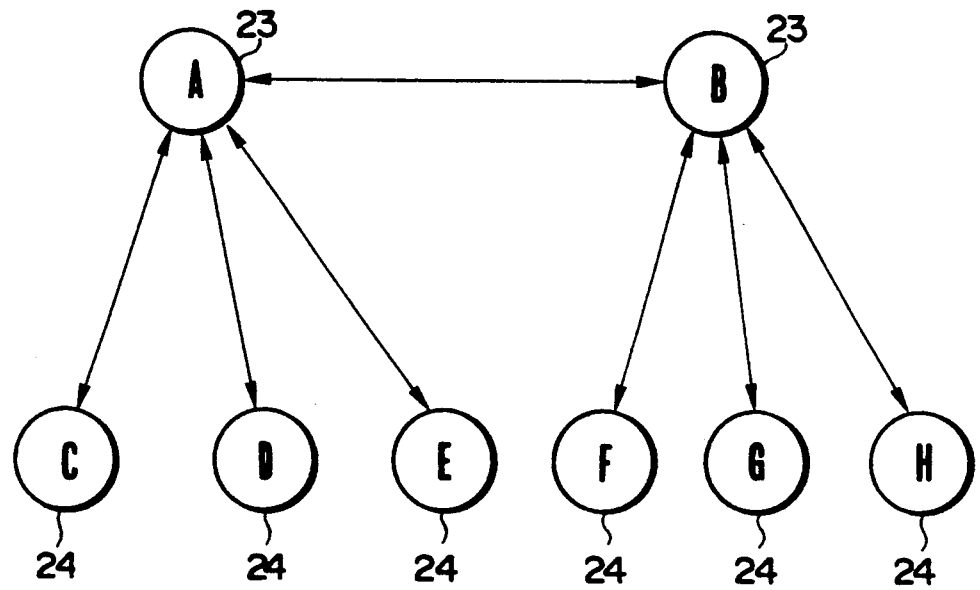
FIG. 4 illustrates the relationship between trader/dealer and customers.
Figure 5:
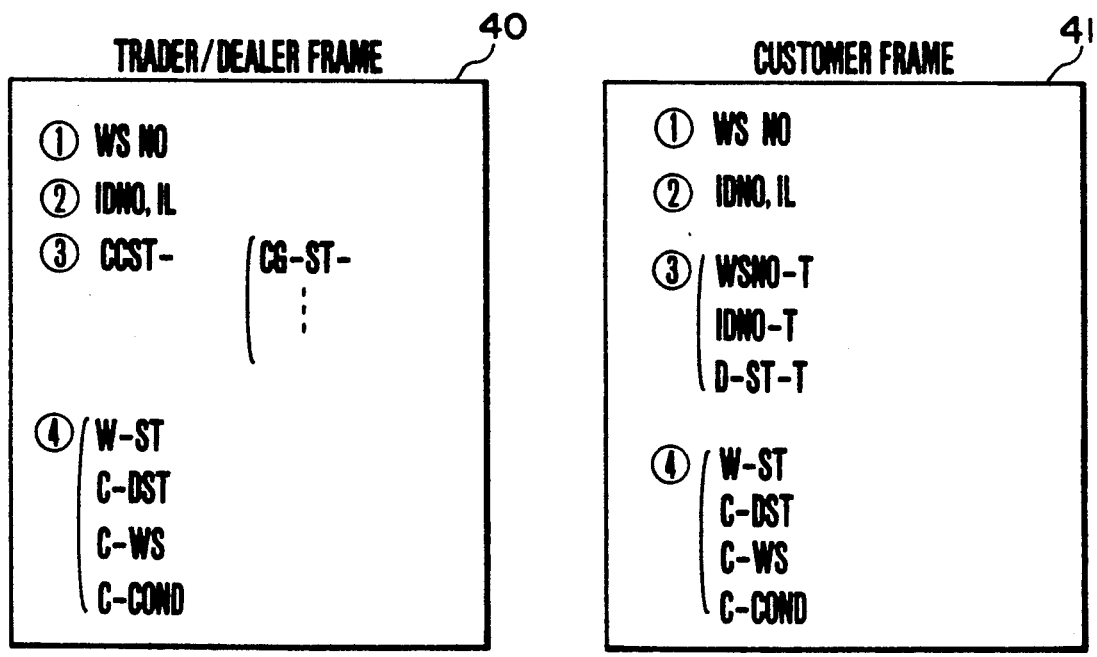
FIG. 5 shows the communication state management frames.

It is first necessary for the host computer 50 to recognize the communication state among work stations. The communication network state among dealers/traders A and B and customers C to H shown in FIG. 4 is managed by representing it in the form of frames as shown in FIG. 5. In this frame representation, each node in the network shown in FIG. 4 is an one-to-one correspondence with a single frame representation. The contents of a frame representation for a dealer/trader frame 40 and a customer frame 41 include the following factors by way of example.

(a) Dealer/trader Communication State Management Frame 40

The dealer/trader frame 40 shown in FIG. 5 is composed of:

(1) A work station number (WSNo) indicative of which work station is used.

(2) IDNo indicative of what dealer/trader is using the workstation, and information supply level indicative of to what level information can be supplied.

Figures 6, 7:
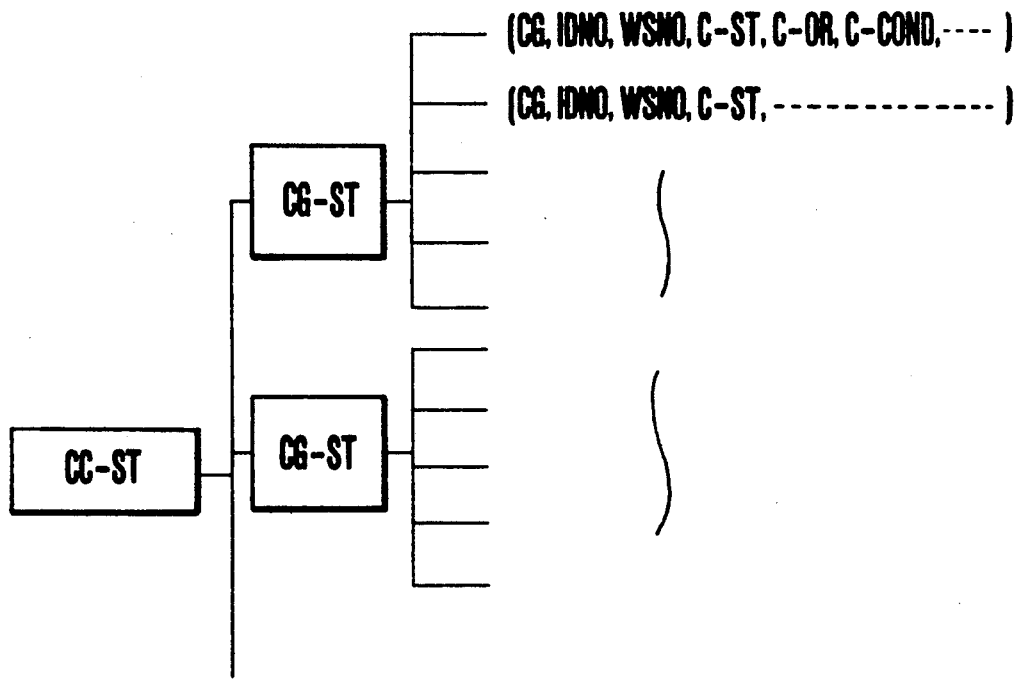
FIG. 6 shows the contents of the communication state management frame.
FIG. 7 shows the generated information protect management table.

(3) Customers Communicable are grouped into customer groups and managed in the manner as shown in FIG. 6. The following information is provided for the management of each customer:

| | |
|---|---|
| CG-ST: | customer group state change detection flag |
| CG: | information supply level of the customer |
| IDNo: | ID number of the customer |
| WSNo: | work station number used by the customer |
| C-ST: | customer state |
| | 0 ... off |
| | 1 ... free |
| | 2 ... request from the customer work station |
| | 3 ... under communication |
| C-OR: | priority order of the customer |
| C-COND: | customer dealing conditions satisfied flag |
| (4) State of Its Own Work Station | |
| W-ST: | work station state |
| | 0 ... no communication |
| | 1 ... under communication |
| C-DST: | ID number of communication destination |
| C-WS: | work station of communication destination |
| C-COND: | satisfied dealing timing |

(b) Customer communication State management Frame 41

The customer frame 41 shown in FIG. 5 is composed of:

(1) A work station number (WSNo) indicative of which work station is used.

(2) IDNo indicative of what customer is using the workstation, and information supply level (IL)

(3) Data such as what dealer/trader is communicable with the work station user, whether or not the dealer/trader is free or not, and other data.

| | |
|---|---|
| WSNo-T: | work station number of the dealer/ trader |
| IDNo-T: | ID number of the dealer/trader |
| D-ST-T: | work station state at the dealer/trader |
| | 0 ... free |
| | 1 ... during communication with another dealer/trader |
| | 2 ... during request from another work station |
| | 3 ... during communication with its own work station |
| (4) State of Its Own Work Station | |
| W-ST | |
| C-DST | |
| C-WS | Same as the dealer/trader work station |
| C-COND | |

Of the data within this frame 41, static data is read out from the data base under management by the host computer 50 and set within the frame 41 at the start of using the work station. Such static data includes:

IL, CG, IDNo and C-OR for the dealer/trader communication state management frame, and IL and IDNo for the customer communication state management frame.

The other data are set within the frame at the start of using the work station or at any time when the state changes.

According to the frame data described above the host computer can grasp the communication state of the network.

(2) Generated Information Protect Management Table 16

There is provided the table 16 (FIG. 7) indicating to which level the information generated by the host computer 50 can be accessed so as to inhibit unnecessary information supply (for the purpose of information protect). Particular information to be protected is managed by the table 16.

(3) Dealing Timing Detection Conditions Knowledge Data Base 14

Figure 8:
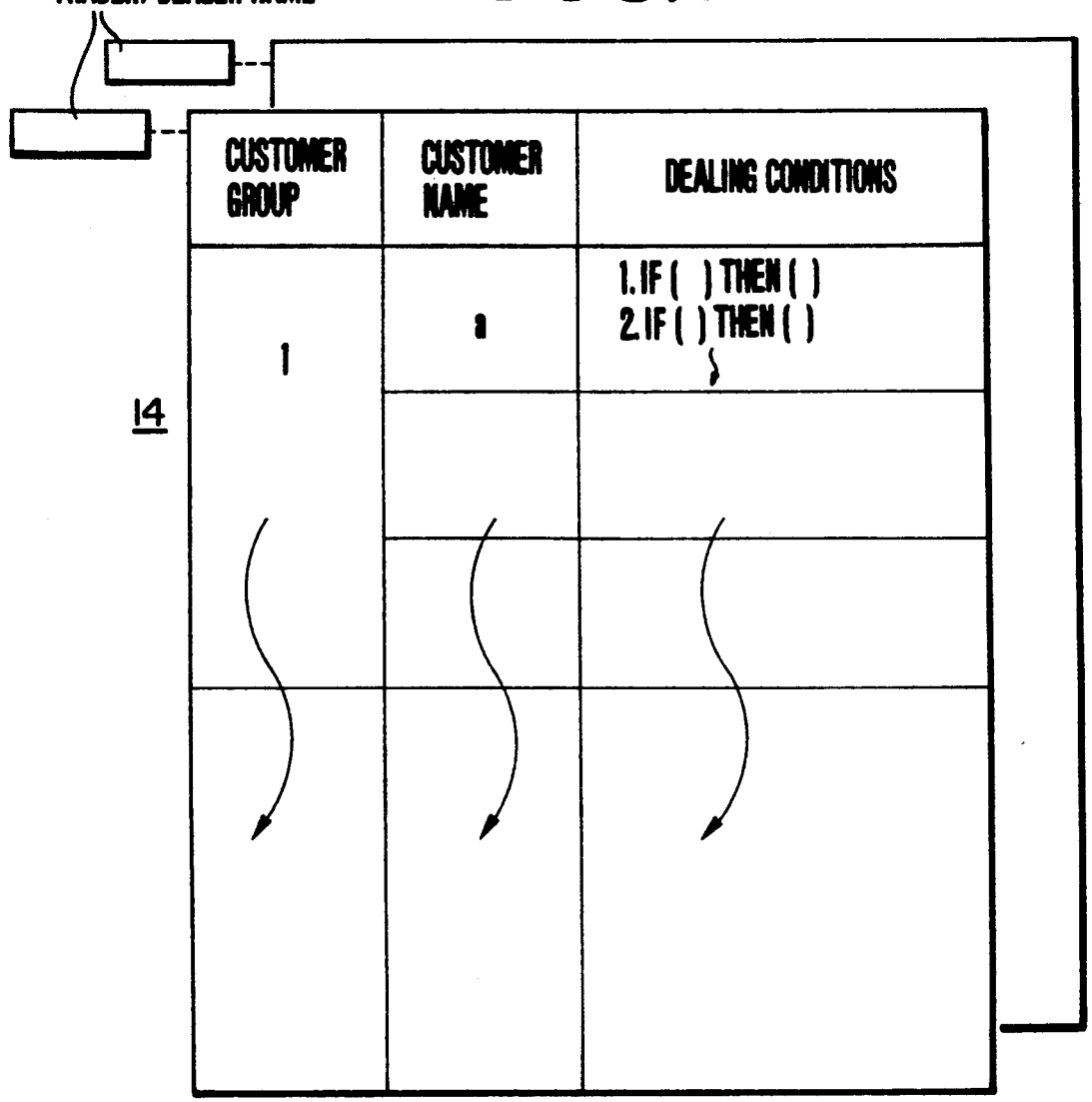
FIG. 8 shows the dealing timing detection conditions knowledge data base.

It is necessary to judge the dealing timing of the asset of a particular customer in accordance with the information input in real-time. There are stored in the knowledge data base 14 the dealing timing conditions of customers in the representation form of "if (...) then (...)". If the dealing timing conditions within the knowledge data base 14 are satisfied, the corresponding dealing timing satisfied flag is made turned ON. The computer 50 can therefore detect the dealing timing automatically in accordance with the data input in real-time. There is shown in FIG. 8 the structure of the dealing timing detection knowledge data base. As shown in FIG. 8, the data base has a hierarchic structure that the dealer/trader, customer group and customer are arranged in this order and the dealing conditions are stored respectively for each customer.

(4) Information Multi-window Output 18

For the dealer/trader and customers, it is necessary to monitor at the work stations the dealing support information, dealing timings, and communication requests by the dealer/trader and customers. To this end, the screen 18 of a work station is divided into three areas including (1) an area for displaying information requested by the work station, (2) an area for displaying dealing timings, and (3) an area for displaying communication requests so as to allow continuous monitoring and judgement of the current state. The size and position of three information output areas are not fixed but may be changed in accordance with the application object.

(5) Information Output Control 12

This program is used for outputting to each work station the processed result, by the decision support information processing program 13, of the logical communication state management frame 15 and generated information protect management table 16.

(6) Communication Request Input 19

This program is used for inputting a communication request by another work station and sending it to the host computer 50.

(7) Communication Request Reception 17

This program is used for receiving a communication request by another work station and updating the contents of the communication state management frame 15.

(8) Data Input 11

This program is used for receiving from the external via a communication line the data necessary for the dealing timing judgement process and decision support information.

(9) Decision Support Information Processing 13

This program is used for processing decision support information by using real-time data. The contents of the information processing include:

(1) dealing support processing for displaying the information requested by the work station on the requested information display area at the work station, and (2) dealing timing detection processing on the basis of the contents of the dealing timing conditions detection knowledge data base.

The results of the dealing timing detection processing are reflected upon the communication state management frame 15.

The functions achieved by the above-described programs and tables are described hereinunder.

The first issue, that the dealer/trader and customer or investor consult each other for the dealing decision while looking at the same information, can be achieved in the following manner. It is possible from the communication state management frame 15 to check which work station is communicating with another work station. In accordance with the check results, the voice communication line of ISDN is connected between the work stations under communication. Supplying the decision support information on the basis of the data input in real-time can be achieved by supplying the information to both the work stations under communication by means of the information output program 12, in accordance with the contents of the communication state management frame 12.

The second issue of information protect management can be achieved in the following manner. The information requested by a work station is judged, on the basis of the information supply level in the communication state management frame 15 and the contents of the generated information protect table 16, whether it can be supplied to the requester, and if the information is to be protected, it is not outputted.

The third and fourth issues of real-time decision of the dealing timing can be achieved in the following manner. The dealing timing is detected by the decision support information processing program 13, by using the data input in real-time and in accordance with the contents of the dealing timing detection conditions knowledge data base 14, and the detection results are reflected upon the dealing conditions satisfied flag of the communication state management frame 15, and displayed on the multi-window display screen 18 of the work station at the dealing timing display area by using the information output control program 12.

The fourth and fifth issues of occurrence of a plurality of communication requests by customers can be achieved in the following manner. The information about requesters is written in the communication state management frame 15 by means of the communication request reception program 17 so that the priority order of the requesters can be judged because the frame 15 stores therein the priority order of each communication destination (customer). Under control of the information output control program 12, the communication request contents of the communication state management frame 15 are displayed on the multi-window display screen 18 of the work station at the communication request display area. It is therefore possible to perform the information output control for real-time dealing support.

The invention will be further described in particular with reference to the accompanying drawings.

Figure 10:
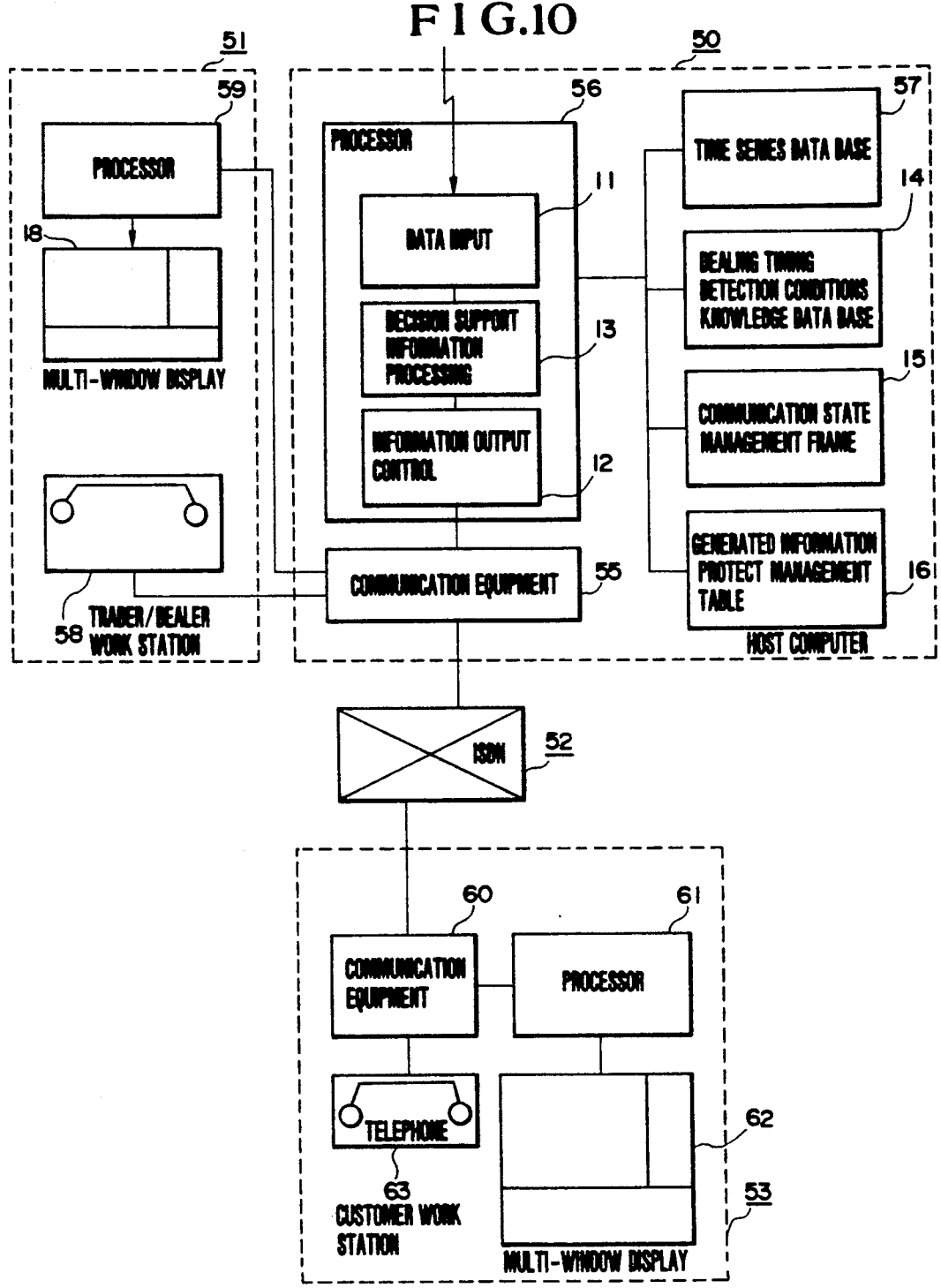
FIG. 10 shows the structure of a real-time decision support system using ISDN (Integrated Services Digital Network).

FIG. 10 shows an example of the system arrangement embodying the present invention. A host computer 50 is coupled to a dealer/trader work station 51 via a communication equipment 55 at an information supplier such as a stock dealing company. A processor 56 of the host computer 50 receives real-time data such as market information by using the data input program 11. In accordance with the input data, there are executed the decision support information processing program 13 and information output control program 12. The host computer 50 also includes a time series data base 57 used during the processings, dealing timing detection conditions knowledge data base 14, communication state management frame 15 and generated information protect management table 16. The work station 51 has a multi-window display 18 and a telephone 58. A customer work station 53 is connected via a communication equipment 60 to a telephone 63 and processor 61.

In FIG. 10, although the dealer/trader work station 51 is shown as installed near the host computer 50, it may be connected to the host computer 50 via ISDN 52.

Figure 11:
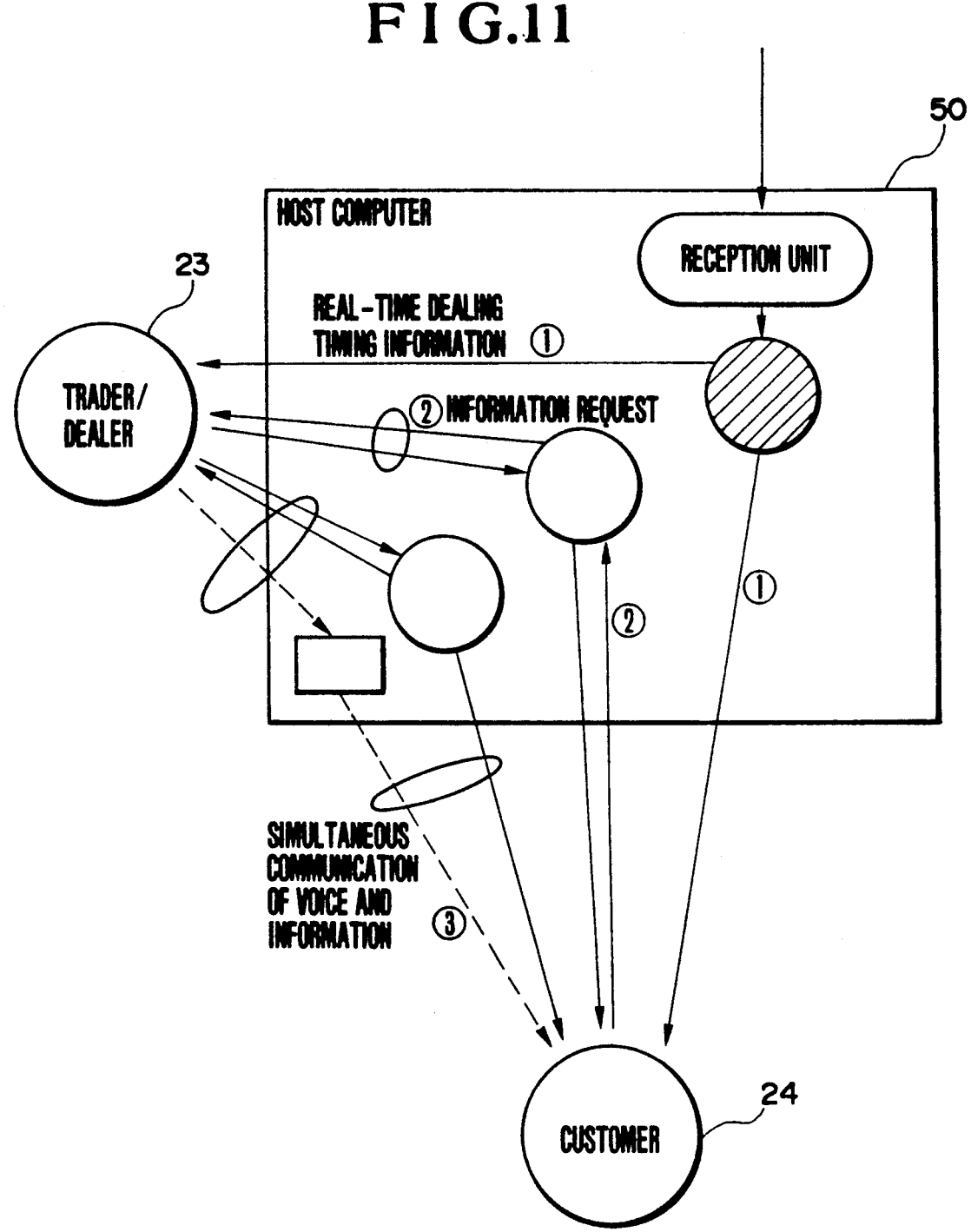
FIG. 11 shows the logical information flow in the real time decision support system.

The logical flow of information and data in the trading support system using ISDN is shown in FIG. 11. Namely, the style of information supply to each terminal device via the host computer 50 is as follows:

(1) real-time dealing timing information display for the real-time data at the reception unit (indicated at circle 1), (2) information display requested by a terminal device (indicated at circle 2), and (3) simultaneous display, or communication of voice and text information indicated at circle 3). The more particular contents thereof will be described hereunder.

(1) Real-time Detection and Display of Dealing Timing

For the trading support system, it becomes necessary to detect a dealing timing while the market information ever-changes and inform a dealer/trader of the detected dealing timing. To this end, there is provided a table for storing the dealing conditions of each customer. This table is the dealing timing detection conditions knowledge data base 14. The dealing conditions are stored on the knowledge unit basis of "if (...) then (...)" type. As the data are input in real-time, the dealing conditions of each customer in the dealing timing detection conditions knowledge data base shown in FIG. 8 are checked, and if there is any customer with satisfied dealing conditions, the corresponding dealer/trader is notified of such effect.

The state of a customer with satisfied dealing conditions results in a change of C-COND and CG-ST at (3) in the dealer/trader frame 40 and C-COND at (4) in the customer frame 41 respectively of the communication state management frames shown in FIGS. 5 and 6, to thereby detect that the dealing conditions for that particular customer have been satisfied.

Figure 13:
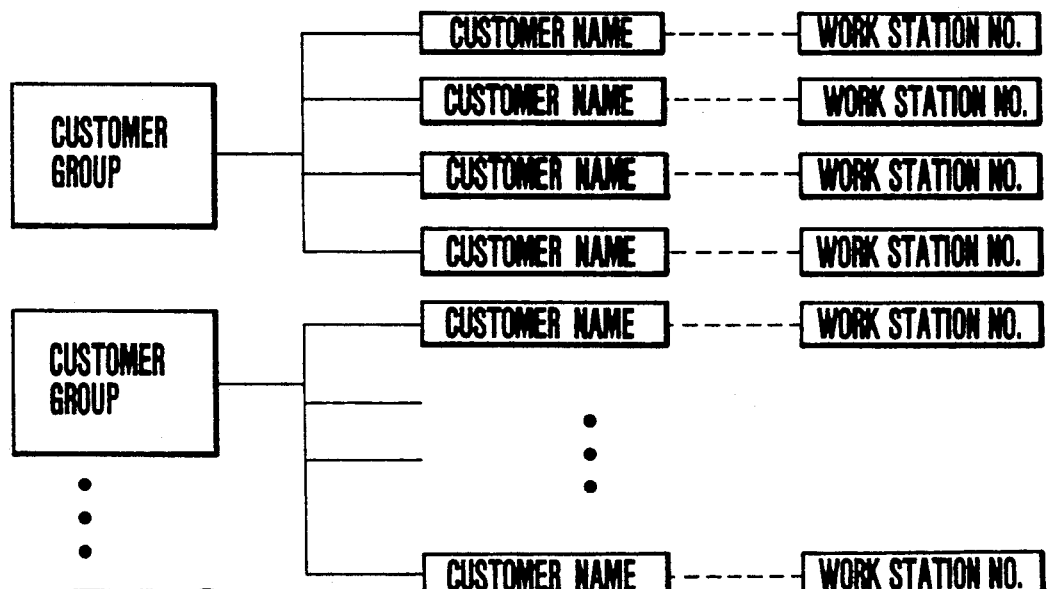
FIG. 13 illustrates the management for customer group and customers.
Figure 14:
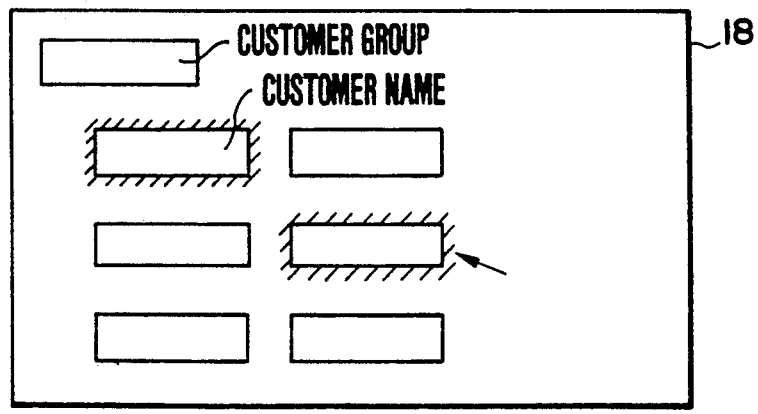
FIG. 14 shows an example of displaying a customer group and customers satisfying the dealing timing conditions.

The dealer/trader is doing another work in most cases. In view of this, there is provided, on the display 18 of the work station 51 of the dealer/trader, a prompter area 25 shown in FIG. 12 for urging the dealer/trader to contact a customer. Since the prompter area 25 is small, all the customer information cannot always be displayed thereon. In view of this, there is introduced a concept of a customer group (FIG. 13) covering a plurality of customers. When the dealing conditions (a change in CG-ST shown in FIG. 6) for a customer are satisfied, a prompter area corresponding to the customer group including the customer is flashed, while referring to the structure shown in FIG. 13. When the dealer/trader points the flashing customer group with a mouse or light pen, the customer name shown in the structure of FIG. 13 is displayed and flashed on the screen 18 of the dealer/trader work station as shown in FIG. 14. When the dealer/trader points the flashing customer name with the mouse or light pen, a voice communication line is connected to the work station of the customer to allow a speech communication. Since the host computer can manage the work station number of a customer by using the table shown in FIG. 5, the image information shown in FIG. 14 and the work station number corresponding to a customer shown in FIG. 13 can also be managed.

Figure 15:
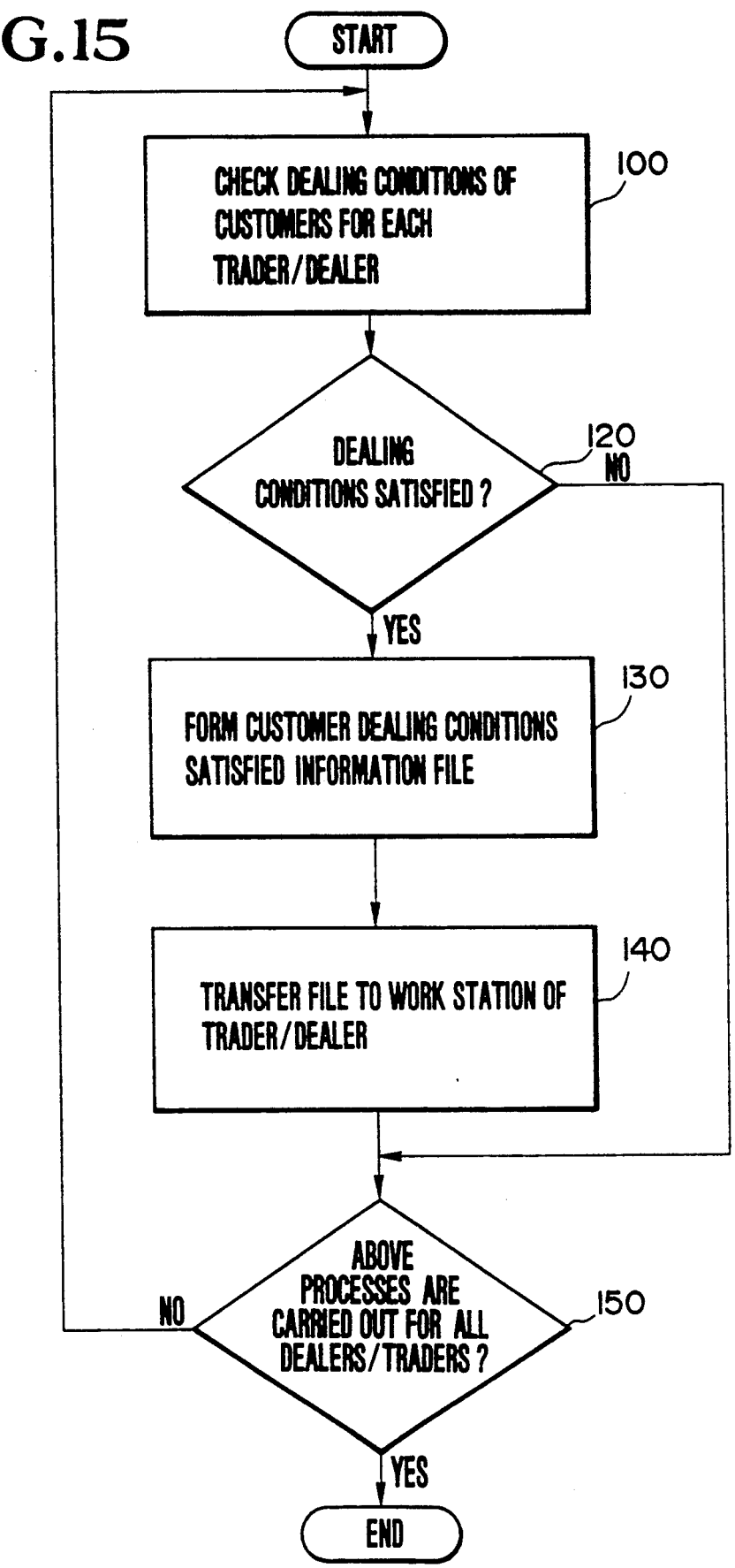
FIG. 15 is a flow chart showing the dealing timing check processes at the host computer.
Figure 16:
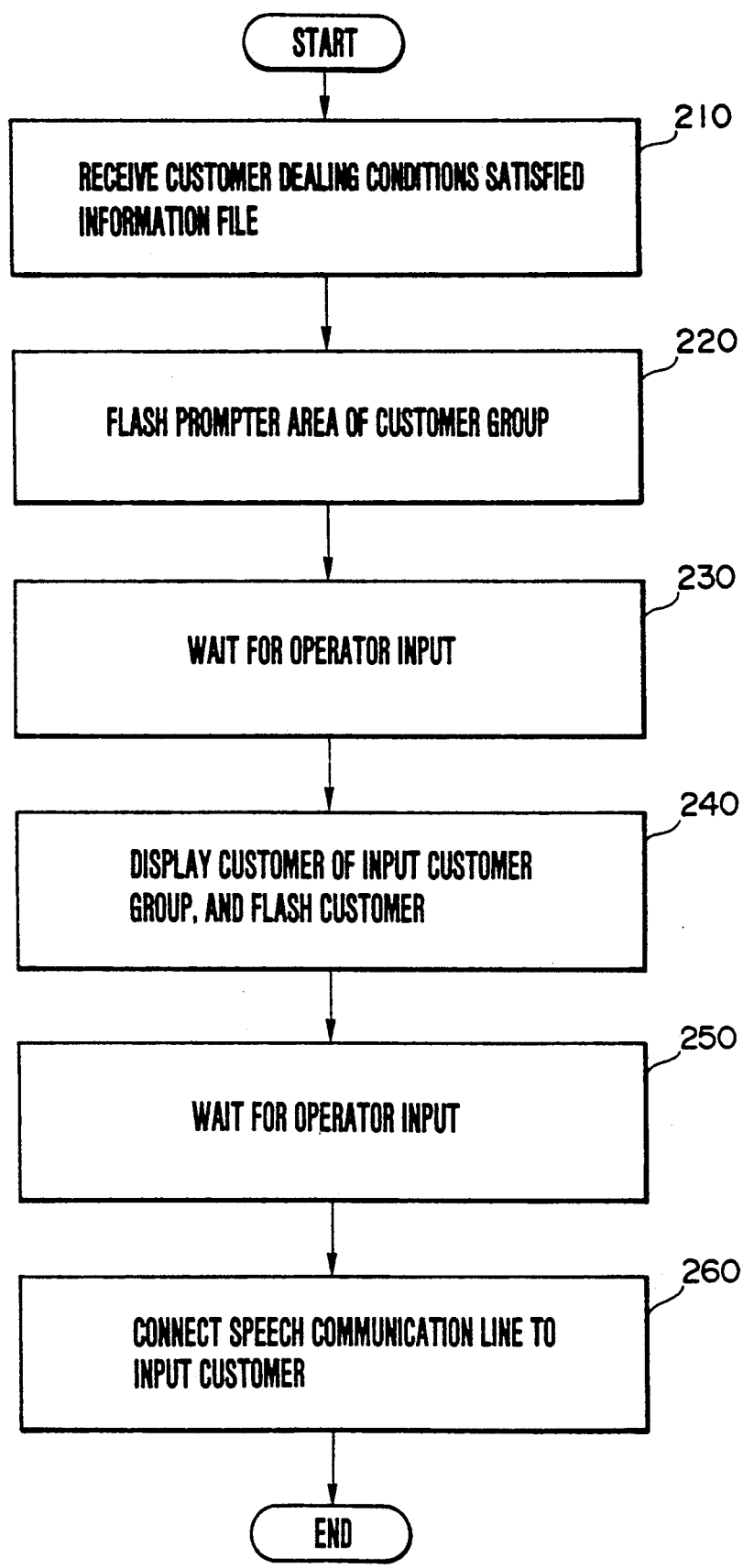
FIG. 16 is a flow chart showing the dealing timing check processes at the work station.

The above operations carried out by the host computer 50 and dealer/trader work station 51 are illustrated in the flow charts shown in FIGS. 15 and 16.

First, the processes by the host computer 50 will be described with reference to the flow chart shown in FIG. 15.

Step 100

Figure 17:
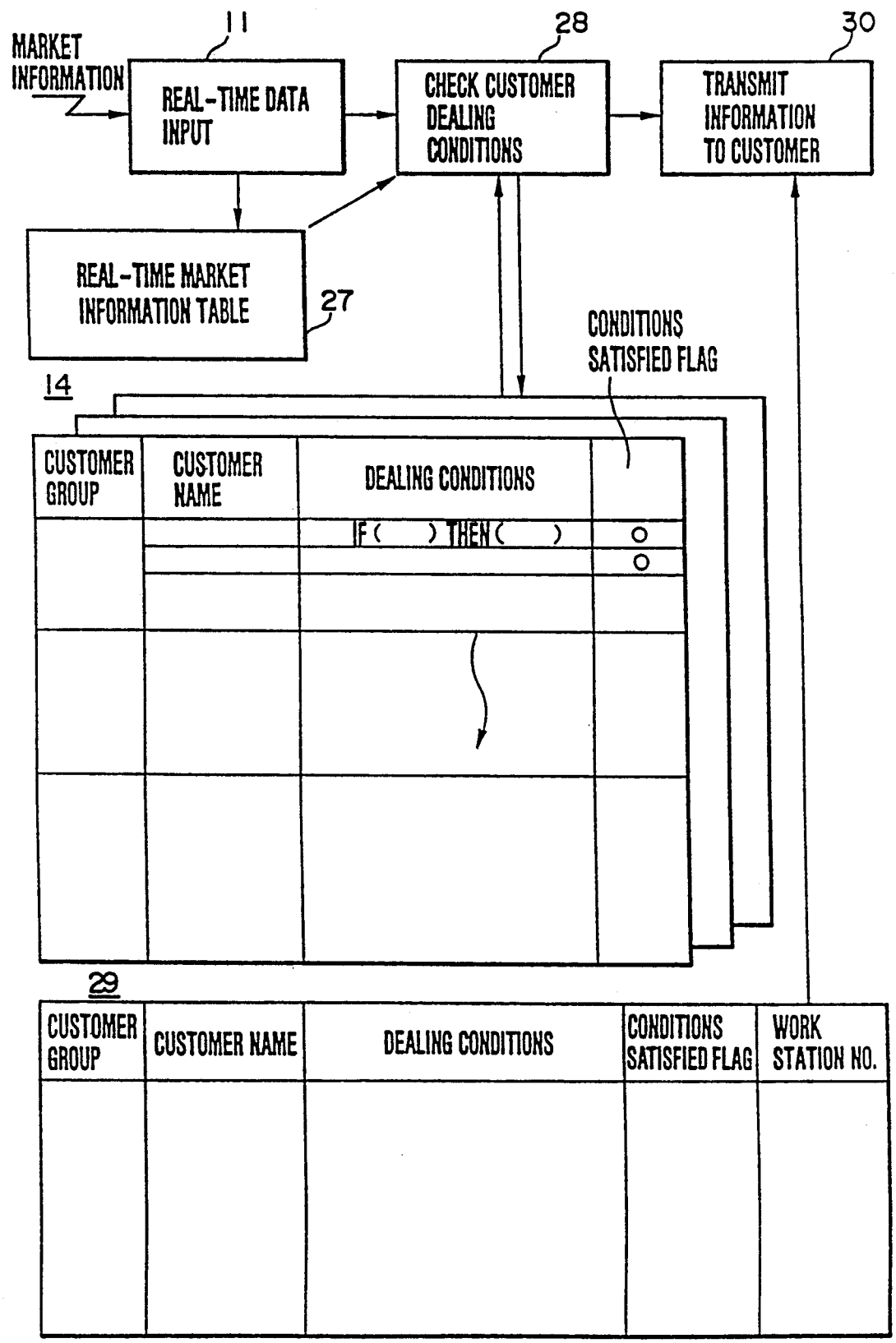
FIG. 17 is a flow chart for dealing timing detection.

Each dealer/trader checks the dealing conditions of his customers. This check is carried out as shown in FIG. 17. Market information is received in real-time (step 11). The host computer 50 forms a real-time market information table 27. In accordance with this table 27 and with the dealing timing detection conditions knowledge data base 14 for each dealer/trader shown in FIG. 8, it is checked if the dealing conditions are satisfied (step 28). First, the condition satisfied flag for each customer is cleared to "0". Next, the dealing conditions of customers are checked one after another. If the conditions are satisfied, the corresponding condition satisfied flag is set at "1".

Step 120

Upon completion of the above-described check, if there is a condition satisfied flag set at "1" for a particular customer, it is necessary to notify the associated dealer/trader of such effect. The flow therefore advances to step 130. If all the condition satisfied flags are "0", it means that all the dealing conditions are not satisfied, and the customer dealing conditions table for the next dealer/trader is checked.

Step 130

The contents of the communication state management frames 40 and 41 are updated for those with satisfied conditions, and there is formed a customer dealing conditions satisfied information file 29 which is constructed of, as shown in FIG. 17, the contents of the customer dealing conditions table 14 and the work station numbers of customers to be communicated which are obtained from the contents of the tables 40 and 41 shown in FIG. 5.

Step 140

The number of the work station used by the dealer/-trader now concerned is obtained from the table shown in FIG. 5, and the prepared customer dealing conditions satisfied information file 29 is supplied via ISDN to the identified work station (step 30).

The above processes are carried out for all dealers/-traders managed by the host computer 50 (step 150), and the processes by the host computer 50 are completed.

The processes by the dealer/trader work station to which data have been transmitted from the host computer, are executed in accordance with the procedure shown in FIG. 16.

Step 210

The customer dealing conditions satisfied information file transmitted from the host computer 50 is received.

Step 220

Figure 12:
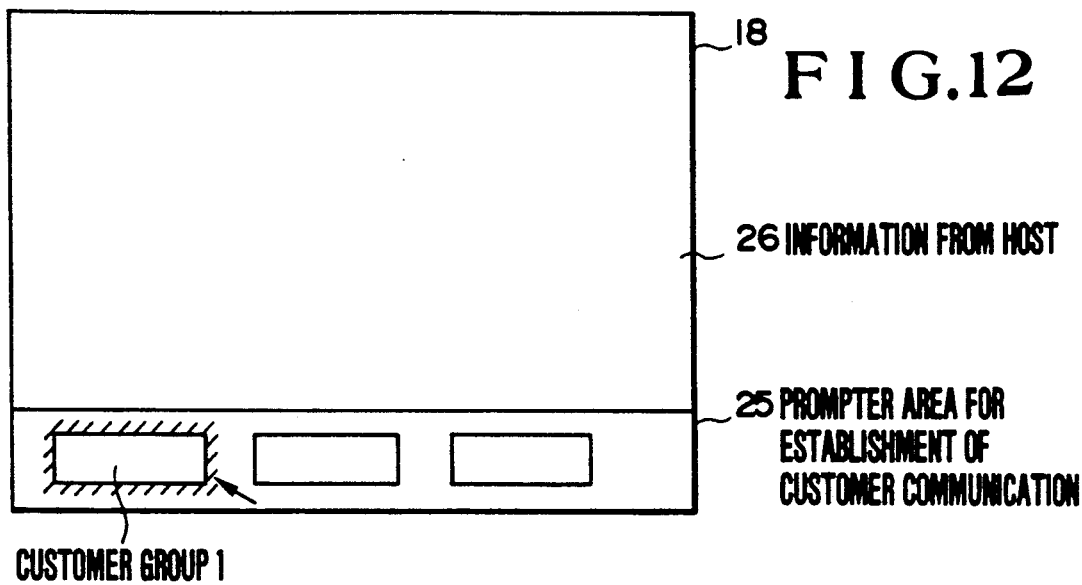
FIG. 12 shows an example of a dealing timing display.

The customer group including a conditions satisifed flag set at "1" is flashed within the prompter area 25 shown in FIG. 12.

Step 230

A state of waiting for an input by an operator. The operator points the flashing customer group with a mouse or light pen.

Step 240

A list of customers belonging to the designated customer group is displayed as shown in FIG. 14, and the customer name with the conditions flag set at "1" is flashed.

Step 250

A state of waiting for an input by the operator. The operator points a desired customer with the mouse or light pen.

Step 260

The number of a work station for the designated customer is searched from the customer dealing conditions satisfied information file 29, and the searched work station is connected via ISDN.

With the above operations, it is possible to establish the communication line to the customer to whom the host computer 50 has determined the satisfied dealing timing.

(2) Display of Information Requested by Work Station

Displaying the information requested by a work station is similar to the general communication between a host computer and a work station. It is however necessary to conduct information protect management because of various types of information requests by many persons such as traders, investors and the like. It is necessary therefore to notify the host computer 50 of what dealer/trader or customer is using a work station.

At each work station, a user ID number and password are inputted at the start of operation. The host computer 50 recognizes the person using the work station, in accordance with a specific number of the work station corresponding to its telephone number and in accordance with the contents of the communication state management frame 40 or 41. The communication state management frame 40 or 41 has the information related to the information supply level representative of that the information accessible by a work station is up to a certain level. The host computer 50 also has a table 16 for discriminating the information serviceable to general customers and the information not serviceable. The structure of this table is shown in FIGS. 5, 6 and 7. By using these tables, it becomes possible to judge the information supply level of a work station under communication. If the information requested by a work station is found to be coincident with the information supply level, while referring to the table 16 shown in FIG. 7, the requested information is supplied to the work station. Otherwise, the requested information is protected. With the above arrangement, even if a general customer tries to access secret information, the customer can be identified to judge if the information is allowed to be supplied, so that the information can be protected.

(3) Simultaneous Communication of Voice and Information

Communications between a dealer/trader and a customer includes information transfer via the host computer 50 and the voice transfer via a telephone. Voice transfer via a telephone uses a voice communication line of ISDN 52.

The information requested by a work station and generated by the host computer 50 is transmitted, together with voices, via ISDN 52 to the work stations at the dealer/trader and customer The information to be transmitted to a customer sometimes include secret information to be protected. In view of this, it is necessary for the host computer 50 to have a function to supervise the communication between work stations and a function to control the information supply to the dealer/trader and customer in a master/slave fashion. To realize this, the host computer 50 controls the information supply by forming a master/slave relation table 70 shown in FIG. 18 including pairs of a master work station and slave work station or stations, in accordance with the contents of the communication state management frames 40 and 41. In accordance with the master/-slave relation table 70 shown in FIG. 18, when the host computer 50 supplies information to a master work station, it also supplies the information to the slave work stations.

The host computer 50 manages the work station state by grouping it into a speech mode and an information supply mode. In the case of the information supply mode, the protect management is effected for the information supply. If a work station is a slave work station, the speech mode is used. These states are managed by the communication state management frames 40 and 41.

The above procedures on the sides of the work station and host computer 50 will be described with reference to FIG. 22.

Step 310

When a communication is acknowledged between a master work station and a slave work station, the host computer 50 registers the number of the master work station (dealer/trader WS) and the number of the slave work station (customer WS) in the master/salve relation table 70. The contents of the communication state management frames 40 and 41 of the work stations shown in FIG. 5 are changed to those for the speech mode.

Step 320

If the master work station is under communication with the slave work station, requested information and conditions used for calculating information are transferred between the master work station and host computer 50. The communication line between the host computer 50 and slave work station is used only for transmitting from the host computer the same information as for the master work station.

Step 330

Upon completion of the speech communication between the master and slave work stations, the master work station notifies the host computer 50 of the end of communication.

Step 340

When the communication end is received from the master work station, the host computer 50 deletes the number of the corresponding work station from the master/slave relation table 70, and switches the mode at the slave work station from the speech mode to the information supply mode to thereafter terminate the speech communication between the dealer/trader and customer.

It is also necessary to provide a procedure for a speech request from a customer.

Figure 9:
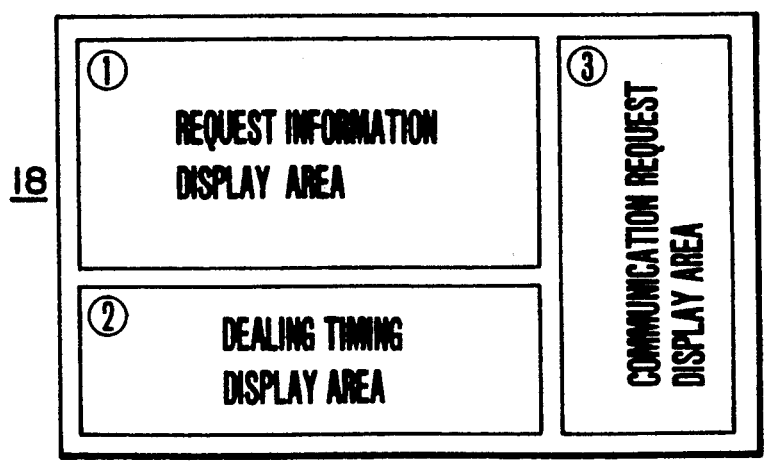
FIG. 9 shows an example of a multi-window display.

A speech communication between the dealer/trader and customer is initiated upon instruction of a dealing timing from the host computer 50 or upon a request from a customer. Upon a request from a customer work station, a customer group (FIG. 13) in the prompter area (indicated at circle 3 in FIG. 9) and the customer name (FIG. 14) are flashed. In this case, it is necessary to discriminate the dealing timing instruction from the host computer 50 and to identify the earliest customer request. To this end, a customer speech request management file 71 is provided as shown in FIG. 19. The file 71 includes therein a customer group, customer name, and request order number. A number 0 is used for no request.

Figure 20:
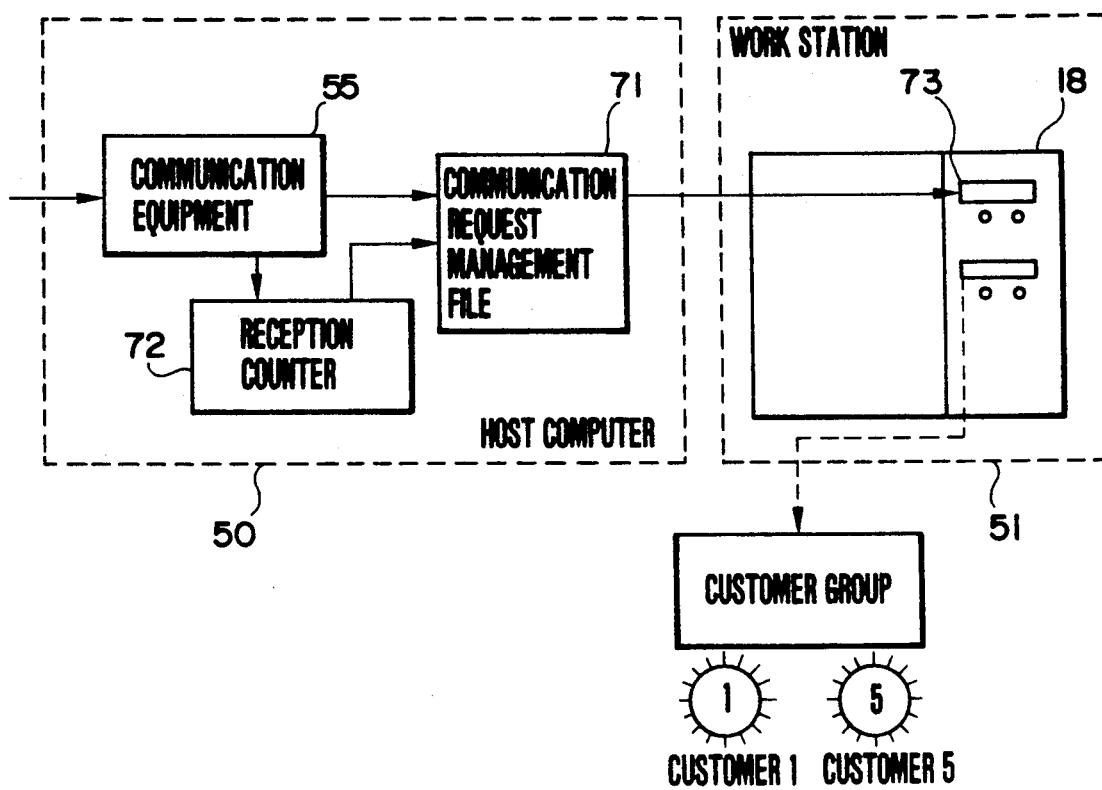
FIG. 20 is a flow chart showing the customer request processes.

The procedure upon a speech request from a customer will be described with reference to FIG. 20 and the flow chart of FIG. 23.

Step 410

A speech request from a customer is received at a communication equipment 55, and a counter indicating a customer request order is incremented by +1.

Step 420

While referring to the number of requester work station, the contents of the counter 72 are entered into the column of the request order number of the speech request management file 71 shown in FIG. 19.

Step 430

The customer group having the request order number other than 0 within the speech request management file 71 is flashed within the prompt area 73 at the right portion of the screen. Flashing within the prompter area 73 is carried out at different positions (lower portion and right portion of the screen) and with different colors, respectively for the dealing timing instruction from the host computer and for the customer speech request.

Step 440

Figure 21:
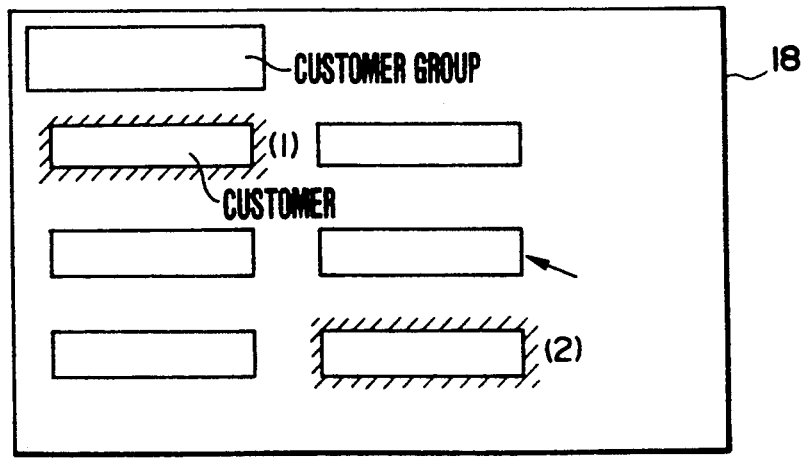
FIG. 21 shows an example of displaying a customer group and customers who made a request.

When a dealer/trader selects the dealing timing instruction from the host computer 50, the image shown in FIG. 14 is displayed on the lower portion of the screen. If a customer speech request is selected, the request order (number within the parentheses in FIG. 21) of a customer is searched from the speech request management file 71, and displayed and flashed at the side of the customer name as shown in FIG. 21.

Step 450

When the dealer/trader points the flashing customer name, a communication is established with its work station. The counter 21 shown in FIG. 20 is then decremented by −1, and the request orders following the designated customer are found from the table 71 shown in FIG. 19 to be decremented each by −1.

With the above procedure, a customer speech request can be identified and managed without intercepting the information supply process for the trading support.

As appreciated from the foregoing description of the present invention, the information generated at the host computer can be used in common, and the dealer/trader of securities is allowed to communicate by using both information and voice. The following advantages essential for such system can be expected.

(1) The dealing conditions of a customer are checked in accordance with real-time market information, and if the conditions are satisfied, the dealer/trader is notified of such effect, to thereby allow information supply to the customer at a most suitable timing.

(2) A speech request is displayed on the prompter area so that it is notified even during monitoring the dealing support information.

(3) Flashing color is changed on the basis of either a speech request or a dealing timing instruction, or the speech request priority order is displayed, thereby allowing the degree of importance of a speech request.

(4) There are also provided secret information protection and a master/slave relation with respect to information supply. Therefore, even if both the dealer/trader and customer access the system, there is no chance for secret information to be leaked out, while supplying necessary dealing information to a customer.

We claim:

1. A decision support system for inputting and outputting information useful for assisting a customer in making decisions related to securities dealing while referring to substantially identical display information as that for a dealer and/or trader, the system comprising:

a computer for obtaining text information necessary for the dealing of securities in accordance with input information corresponding to said securities, and outputting said text information necessary for the dealing of said securities;

a communication network connected to said computer for transferring the text information and voice information;

a first terminal device used by said dealer and/or trader and connected to said communication network for displaying said text information necessary for the dealing of said securities supplied from said computer, and for inputting and outputting the voice information;

a second terminal device used by said customer and connected to said communication network for displaying said text information necessary for the dealing of said securities supplied from said computer, and for inputting and outputting said voice information to and from said first terminal device via said communication network;

a knowledge data base connected to said computer for storing dealing conditions regarding said securities of said customer; and, a communication management frame for grouping communication counterparts into groups and for managing a communication request to determine from which customer the communication request is received;

wherein if the input information regarding said securities satisfies said dealing conditions stored in said knowledge data base, said computer outputs, to said first terminal device via said communication network, customer information regarding said customer and corresponding to said dealing conditions and said test information necessary for the dealing of said securities, and, further wherein priority information is provided to said dealer and/or trader to determine which of a plurality of customer terminals connected to said communication network is to be selected as a counterpart terminal for one to one communication based on a condition of said knowledge data base and the state of said communication management frame and to establish a one-to-one communication with a customer having a high priority.

2. The decision support system according to claim 1, wherein said first terminal device displays the customer information regarding another customer while displaying said text information necessary for the dealing of said securities regarding to said customer.

3. The decision support system according to claim 1, further comprising:

a third terminal device to be used by another customer and connected to said communication network for inputting a communication request to said dealer and/or trader and for outputting said input communication request to said computer via said communication network;

wherein said computer outputs customer information regarding said communication request supplied from said third terminal device to said first terminal device via said communication network; and further wherein said first terminal device displays the customer information regarding said communication request by said another customer while displaying said text information necessary for the dealing of said securities regarding said customer.

4. The decision support system according to claim 3, wherein said first terminal device displays said customer information regarding said communication request by said another customer in a mode different from that of said text information necessary for the dealing of said securities.

5. The decision support system according to claim 3, wherein if there are a plurality of other customers, the customer information regarding communication requests by said plurality of other customers is displayed in accordance with a priority order assigned to each of said plurality of other customers.

6. The decision support system according to claim 1, further comprising means for storing a condition for an information disclosure level of each customer, wherein said computer includes a table for storing management information for managing an output of said text information necessary for the dealing of said securities, and if said management information stored in said table indicates a permission of outputting said text information necessary for the dealing of said securities to said second terminal device, said text information necessary for the delaying of said securities is outputted to said second terminal device via said communication network, so that a judgment of information as to whether the information is allowed to be provided is made in accordance with the information disclosure level of the customer.

7. A decision support method for inputting and outputting information useful for assisting a customer in making decisions related to securities dealing while referring to substantially identical display information as that for a dealer and/or trader, in a system including a computer, a first terminal device to be used by the dealer and/or trader, and a second terminal device to be used by the customer, the method comprising steps of:

obtaining by the computer text information necessary for the dealing of securities in accordance with input information corresponding to said securities;

outputting by the computer said text information necessary for the dealing of said securities to said first and second terminal devices;

permitting an input and output of voice information between said first terminal device to be used by said dealer and/or trader and said second terminal device to be used by said customer;

storing dealing conditions regarding said securities of said customer in a knowledge data base connected to said computer;

grouping communication counterparts into groups and managing a communication request to determine from which customer the communication request is received by a communication management frame;

wherein if the input information regarding said securities satisfies said dealing conditions stored in said knowledge data base, outputting by said computer, to said first terminal device via a communication network, customer information regarding said customer and corresponding to said dealing conditions and said text information necessary for the dealing of said securities and providing priority information to said dealer and/or trader to determine which of a plurality of customer terminals connected to said communication network is to be selected as a counterpart terminal for one to one communication based on a condition of said knowledge data base and a state of said communication management frame and to establish the one-to-one communication with a customer having a high priority.

8. The decision support method according to claim 7, wherein when the input information regarding said securities satisfies said dealing conditions stored in said knowledge data base, the outputting to said first terminal device customer information regarding said another customer and corresponding to said dealing conditions occurs while displaying said text information necessary for the dealing of said securities regarding said customer.

9. The decision support method according to claim 7, wherein there is provided a third terminal device to be used by another customer, the method further comprising:

inputting from said third terminal device a communication request to said dealer and/or trader; and, outputting said input communication request to said first terminal while displaying said text information necessary for the dealing of said securities regarding said customer.

10. The decision support method according to claim 9, wherein the displaying by said first terminal device of customer information regarding said communication request by said another customer occurs in a mode different from that of said text information necessary for the dealing of said securities regarding to said customer.

11. The decision support method according to claim 9, wherein if there are a plurality of other customers, the method further comprises displaying customer information regarding communication requests by said plurality of other customers in accordance with a priority order assigned to each of said plurality of other customers.

12. The decision support method according to claim 7, wherein there is provided a table for storing management information for managing an output of said text information necessary for the dealing of said securities, the method further comprising:

outputting, if said management information stored in said table indicates a permission of outputting said text information necessary for the dealing of said securities to said second terminal device, to said second terminal said text information necessary for the dealing of said securities; and storing a condition for an information disclosure level of each customer, so that a judgment of information as to whether the information is allowed is provided in accordance with the information disclosure level of the customer.

13. A securities dealing support system having a computer for assisting a customer known to a dealer/trader in making a decision in securities dealing, the system comprising:

a customer terminal;

a dealer/trader terminal;

means for receiving market information, the market information comprising shared text information and protected text information;

a communication network for transferring the shared and protected text information and voice information in the system;

means for providing the shared text information to the customer through the customer terminal and the dealer/trader through the dealer/trader terminal by using the communication network;

means for displaying the shared text information on the customer terminal and the dealer/trader terminal;

means for providing the protected text information to only the dealer/trader terminal by using the communication network;

means for displaying customer information corresponding to another customer on the dealer/trader terminal while the shared text information is being displayed thereon;

a knowledge data base connected to said computer for storing dealing conditions regarding said securities of said customer; and, a communication management frame for grouping communication counterparts into groups and for managing a communication request to determine from which customer the communication request is received;

wherein if the input information regarding said securities satisfies said dealing conditions stored in said knowledge data base, said computer outputs, to said first terminal device via said communication network, customer information regarding said customer and corresponding to said dealing conditions and said text information necessary for the dealing of said securities; and, further wherein priority information is provided to said dealer/trader to determine which of a plurality of customer terminals connected thereto is to be selected as a counterpart terminal for one to one communication based on a condition of said knowledge data base and a state of said communication management frame and to establish the one-to-one communication with a customer having a high priority is made possible.

14. The system of claim 13 further including means for allowing simultaneous exchange of the voice information and the shared text information between the customer and the dealer/trader.

* * * * *

UNITED STATES PATENT AND TRADEMARK OFFICE
CERTIFICATE OF CORRECTION

PATENT NO. : 5,267,148
DATED : November 30, 1993
INVENTOR(S) : Michitaka Kosaka, et al.

It is certified that error appears in the above-identified patent and that said Letters Patent is hereby corrected as shown below:

Claim 1, column 13, line 32, delete "the" and substitute therefor --a--.

Claim 6, column 14, line 13, delete "delaying" and substitute therefor --dealing--.

Column 13, line 34, "a" has been changed to read --the--.

Signed and Sealed this

Twenty-eighth Day of June, 1994

Attest:

BRUCE LEHMAN

*Attesting Officer*     *Commissioner of Patents and Trademarks*